(12) United States Patent
Tamura et al.

(10) Patent No.: US 10,011,164 B2
(45) Date of Patent: Jul. 3, 2018

(54) IN-WHEEL MOTOR DRIVE UNIT

(71) Applicants: NTN CORPORATION, Osaka (JP); Shiro Tamura, Shizuoka (JP); Aiko Ishikawa, Shizuoka (JP); Yusuke Shibuya, Shizuoka (JP)

(72) Inventors: Shiro Tamura, Shizuoka (JP); Aiko Ishikawa, Shizuoka (JP); Yusuke Shibuya, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/021,331

(22) PCT Filed: Sep. 2, 2014

(86) PCT No.: PCT/JP2014/073008
§ 371 (c)(1),
(2) Date: Mar. 11, 2016

(87) PCT Pub. No.: WO2015/041038
PCT Pub. Date: Mar. 26, 2015

(65) Prior Publication Data
US 2016/0221432 A1 Aug. 4, 2016

(30) Foreign Application Priority Data

Sep. 19, 2013 (JP) .............................. 2013-194354

(51) Int. Cl.
*B60K 7/00* (2006.01)
*B60G 3/20* (2006.01)
(Continued)

(52) U.S. Cl.
CPC .............. *B60K 7/0007* (2013.01); *B60G 3/20* (2013.01); *B60G 3/22* (2013.01); *B60K 17/043* (2013.01);
(Continued)

(58) Field of Classification Search
CPC ............... B60K 7/0007; B60K 17/043; B60K 2007/0092; B62K 2204/00; B62K 2202/00; B62M 7/12; B62M 6/65
See application file for complete search history.

(56) References Cited

U.S. PATENT DOCUMENTS

| 7,017,694 | B2 * | 3/2006 | Shirazawa | ........... B62K 25/283 180/220 |
| 7,735,588 | B2 * | 6/2010 | Murata | ..................... B60G 3/20 180/65.51 |
| 2003/0010551 | A1 * | 1/2003 | Shirazawa | ........... B62K 25/283 180/65.6 |

(Continued)

FOREIGN PATENT DOCUMENTS

| CN | 1101178 | 4/1995 |
| CN | 201264516 | 7/2009 |

(Continued)

*Primary Examiner* — Bryan A Evans
(74) *Attorney, Agent, or Firm* — Clark & Brody (57) ABSTRACT

An in-wheel motor drive unit (11) includes: a motor portion (11A) that is placed on one side in the direction of the axis of the in-wheel motor drive unit; a wheel hub portion (11C) that is placed on the other side in the direction of the axis of the in-wheel motor drive unit; a speed reduction portion (11B) that is placed between the motor portion and the wheel hub portion and that reduces the speed of output rotation of the motor portion to transmit the resultant output rotation to the wheel hub portion; and a first arm portion (34) that is formed integrally with a speed reduction portion casing (33) forming the outer shape of the speed reduction portion, that projects in a direction perpendicular to the axis from the speed reduction portion casing, and that has its tip end pivotally coupled to a vehicle body-side member.

7 Claims, 10 Drawing Sheets

(51) Int. Cl.
*B60G 3/22* (2006.01)
*B60K 17/04* (2006.01)

(52) U.S. Cl.
CPC .. *B60G 2200/144* (2013.01); *B60G 2200/182* (2013.01); *B60G 2204/182* (2013.01); *B60G 2206/014* (2013.01); *B60G 2206/50* (2013.01); *B60K 17/046* (2013.01); *B60K 2007/0038* (2013.01); *B60K 2007/0092* (2013.01)

(56) References Cited

U.S. PATENT DOCUMENTS

| | | | | |
|---|---|---|---|---|
| 2006/0272871 A1* | 12/2006 | Murata | ............... | B60G 3/20 180/65.51 |
| 2012/0217789 A1* | 8/2012 | Yamamoto | ............... | B60G 3/20 301/6.5 |
| 2013/0057048 A1* | 3/2013 | Ishikawa | ............... | B60K 7/0007 301/6.5 |

FOREIGN PATENT DOCUMENTS

| | | | | |
|---|---|---|---|---|
| EP | 2572908 | | 3/2013 | |
| EP | 2572908 A1 * | 3/2013 | ........... | B06K 7/0007 |
| FR | 2726230 | | 5/1996 | |
| JP | 2005-178410 | | 7/2005 | |
| JP | 2005-271909 | | 10/2005 | |
| JP | 2008-189062 | | 8/2008 | |
| JP | 2010-116017 | | 5/2010 | |
| JP | 2011-240739 | | 12/2011 | |
| JP | 2013-124016 | | 6/2013 | |
| WO | 2012/120648 | | 9/2012 | |
| WO | 2012/123175 | | 9/2012 | |

* cited by examiner

IN-WHEEL MOTOR DRIVE UNIT

TECHNICAL FIELD

The present invention relates to in-wheel motor drive units that drive a wheel and also relates to structures that attach an in-wheel motor drive unit to a suspension device.

BACKGROUND ART

In-wheel motor drive units are advantageous due to their small environmental loads as they are driven by electricity, and are also advantageous as they are mounted in wheels of automobiles to drive the wheels and thus a larger interior space can secured as compared to engine automobiles. For example, a technique of suspending an in-wheel motor drive unit from a high-mount double wishbone suspension device is proposed as a structure for attaching an in-wheel motor drive unit to a suspension device on a vehicle body (see Non-Patent Literature 1).

Non-Patent Literature 1 specifically discloses a coupling structure between an in-wheel motor drive unit and a high-mount double wishbone suspension device. In a typical high-mount double wishbone suspension device for use in engine vehicles, a steered wheel is attached to a knuckle and the knuckle is coupled to a lower arm and an upper arm, as described in, e.g., Japanese Unexamined Patent Application Publication No. 2005-178410 (Patent Literature 1). In view of Patent Literature 1, the in-wheel motor drive unit is attached and fixed to a knuckle in Non-Patent Literature 1.

Moreover, the applicant has already proposed a technique described in Japanese Unexamined Patent Application Publication No. 2010-116017 (Patent Literature 2). In the technique of Patent Literature 2, a casing of an in-wheel motor drive unit is provided with seats that are coupled to a trailing arm of a suspension device. Each seat has a flat surface facing downward and a threaded hole formed in a direction perpendicular to the flat surface. Bolts inserted through the trailing arm are screwed into the threaded holes, so that the trailing arm closely contacts the flat surfaces of the seats and the suspension device is coupled and fixed to the trailing arm.

CITATION LIST

Non-Patent Literature

NPTL 1: Satoshi MURATA, "139-20105175 Development of In-Wheel Motor Drive Unit," Proceedings No. 28-10, Society of Automotive Engineers of Japan, Inc., 2010

Patent Literatures

PTL 1: Japanese Unexamined Patent Application Publication No. 2005-178410
PTL 2: Japanese Unexamined Patent Application Publication No. 2010-116017

SUMMARY INVENTION

Technical Problem

In the case of attaching and fixing the in-wheel motor drive unit to a knuckle in Non-Patent Literature 1, the attachment portions of the in-wheel motor drive unit and the knuckle need to be thick in order to ensure attachment strength, and a large number of bolts and nuts are required, thereby increasing the overall weight. This results in increased unsprung weight of a suspension device, affecting ride comfort performance. Patent Literature 2 also has a similar problem.

In view of the above circumstances, it is an object of the present invention to provide a structure capable of attaching an in-wheel motor drive unit to a suspension device without causing an increase in weight.

Solution to Problem

In order to achieve the above object, an in-wheel motor drive unit according to the present invention includes: a motor portion that is placed on one side in a direction of an axis of the in-wheel motor drive unit; a wheel hub portion that is placed on the other side in the direction of the axis of the in-wheel motor drive unit; a speed reduction portion that is placed between the motor portion and the wheel hub portion and that reduces a speed of output rotation of the motor portion to transmit the resultant output rotation to the wheel hub portion; and a first arm portion that is formed integrally with a speed reduction portion casing forming an outer shape of the speed reduction portion, that projects in a direction perpendicular to the axis from the speed reduction portion casing, and that has its tip end pivotally coupled to a vehicle body-side member.

According to the present invention, the first arm portion that is coupled to a vehicle body or the vehicle body-side member such as a suspension device is formed integrally with the casing of the speed reduction portion. This eliminates the need to couple and fix the first arm portion to a casing of the in-wheel motor drive unit with a bolt, a nut, etc. as in conventional examples. Accordingly, the connection portion between the first arm portion and the in-wheel motor drive unit can be made thinner than in the conventional examples, and also no bolt, nut, etc. is required, whereby reduction in unsprung weight of the suspension device can be achieved. Moreover, since the first arm portion is formed integrally with the casing of the speed reduction portion, the number of parts can be reduced. Since the first arm portion of the present invention is not coupled to the motor portion, neither a vehicle body load nor a lateral load is applied to the motor portion, and there is no risk of deformation of the motor portion due to an excessive load. As used herein, the "vehicle body-side member" refers to a member located on the vehicle side with respect to a member being mentioned. Accordingly, the vehicle-side member for the in-wheel motor drive unit is the suspension device and the vehicle body.

The first arm portion of the present invention need only be integral with at least a part of the speed reduction portion casing, and a specific connection structure of the first arm portion and the speed reduction portion casing is not particularly limited. In one embodiment, the wheel hub portion has a hub ring that is coupled to a wheel and an outer ring member that rotatably supports the hub ring, and the outer ring member has a smaller radius dimension than that of the speed reduction portion casing. The speed reduction portion casing includes a speed reduction portion casing end face portion that covers an end of the speed reduction portion which is located on the other side in the direction of the axis. An inner periphery of the speed reduction portion casing end face portion is coupled to the outer ring member, and an outer periphery of the speed reduction portion casing end face portion is integral with the first arm portion. In another embodiment, an outer peripheral surface of the tubular portion may be integral with the first arm portion. According to this embodiment, the first arm portion formed integrally with the in-wheel motor drive unit can be extended to a position outside a road wheel through an annular space between an outer peripheral surface of the speed reduction portion and an inner peripheral surface of the road wheel of the wheel. The first arm portion can thus be arranged in a manner that is preferable for a suspension member for a steered wheel or a non-steered wheel. Since the speed reduction portion casing end face portion is located closest to the wheel among the members of the speed reduction portion, the vehicle body load supported by the first arm portion can be transmitted to the wheel over a short distance in the direction of the axis. It should be understood that the connection portion between the first arm portion and the speed reduction portion casing which are together formed as a single-piece member may extend on both the outer peripheral surface of the speed reduction portion casing and an end face of the speed reduction portion casing which is located on the other side in the direction of the axis.

The first arm portion of the present invention can support the vehicle body load to serve as a suspension member of the suspension device. In a first example in which the first arm portion serves as the suspension member, a tip end of the first arm portion of the present invention may be pivotally coupled to a free end of a suspension arm of the suspension device. In one embodiment, the first arm portion projects upward from the speed reduction portion casing, and an upper end of the first arm portion is pivotally coupled to a free end of an upper arm of a double wishbone suspension device. In a preferred embodiment, the in-wheel motor drive unit may further include: a joint portion that is formed integrally with the speed reduction portion casing and that is coupled to a free end of a lower arm of the double wishbone suspension device. According to this embodiment, reduction in unsprung weight, an increase in strength of unsprung parts, and reduction in the number of unsprung parts can be achieved in the case of using a double wishbone suspension device, reduction in unsprung weight. Although the double wishbone suspension device of this embodiment is a high-mount double wishbone suspension device, the present invention is also applicable to other types of double wishbone suspension devices.

In a more preferred embodiment of the present invention, the in-wheel motor drive unit further includes: a second arm portion that is formed integrally with the speed reduction portion casing and that projects in the direction perpendicular to the axis from the speed reduction portion casing, and a tip end of the second arm portion is coupled to a power source for a steering device. According to this embodiment, reduction in unsprung weight, an increase in strength, and reduction in the number of parts can be achieved in the suspension device that attaches a steered wheel to the vehicle body.

In a second example in which the first arm portion serves as the suspension member, the first arm portion may function as a suspension arm that swings in a vertical direction. In this case, the first arm portion swings in the vertical direction with the tip end of the first arm portion as a base end and a base part of the first arm portion as a free end. In one embodiment, the first arm portion is a trailing arm of a trailing arm suspension device and projects from the speed reduction portion casing toward a front of the vehicle. According to this embodiment, the first arm portion is used as a trailing arm in the case of using a trailing arm suspension device. Reduction in unsprung weight, an increase in strength, and reduction in the number of parts can therefore be achieved in the suspension device that attaches a rear wheel, a non-steered wheel, etc. to the vehicle body.

Since the first arm portion of the present invention is attached to the vehicle body via the suspension device, the first arm portion is classified as the unsprung weight of the suspension device. It is desirable that the unsprung weight of the suspension device be as light as possible. In one embodiment of the present invention, the first arm portion and the speed reduction portion casing are made of aluminum or an aluminum alloy. According to this embodiment, the first arm portion and the speed reduction portion casing can be made lighter than conventional steel knuckles, and further reduction in weight of the in-wheel motor drive unit can be achieved.

Advantageous Effects of Invention

As described above, according to the present invention, no load is applied to the motor portion, and the connection portion between the first arm portion and the in-wheel motor drive unit can be made thinner than in the conventional examples. Moreover, no coupling member such as a bolt and a nut is required to couple the first arm portion to the in-wheel motor drive unit. Accordingly, reduction in the number of parts and reduction in unsprung weight of the suspension device can be achieved. The present invention can thus provide advantageous effects in in-wheel motor drive units that include a heavy motor portion susceptible to deformation and that are not supported by a suspension device and thus need to support a vehicle body load.

DESCRIPTION OF EMBODIMENTS

Figure 1:
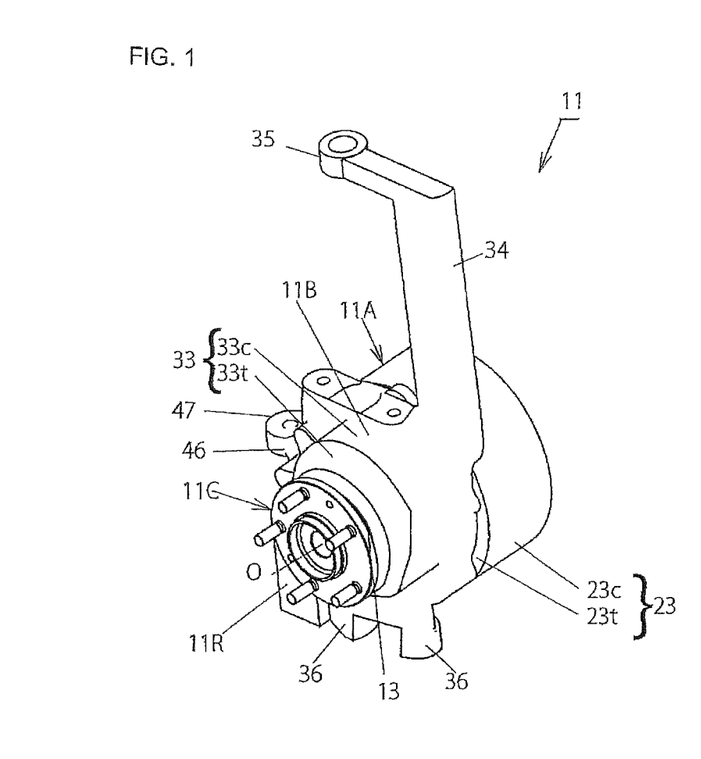
FIG. 1 is a perspective view of an in-wheel motor drive unit according to an embodiment of the present invention.
Figure 2:
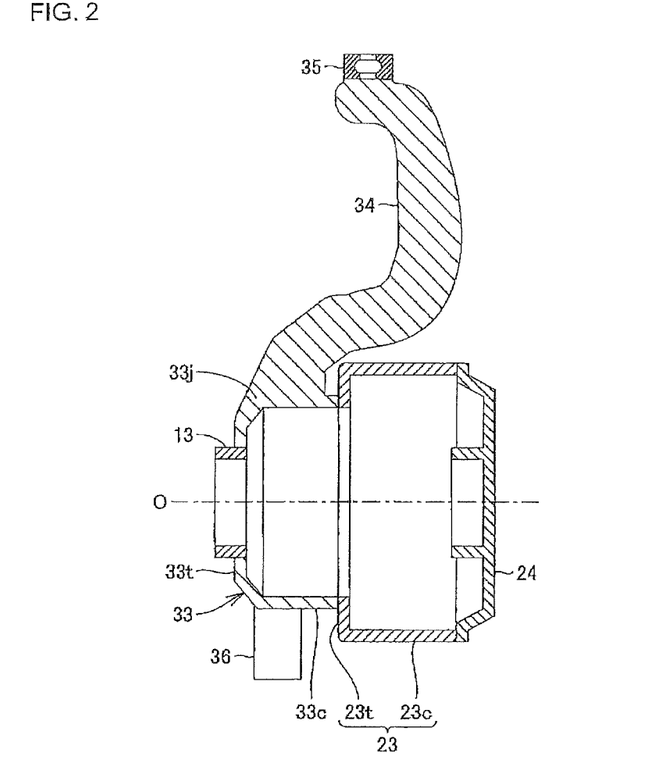
FIG. 2 is a schematic sectional view of a casing of the embodiment.
Figure 3:
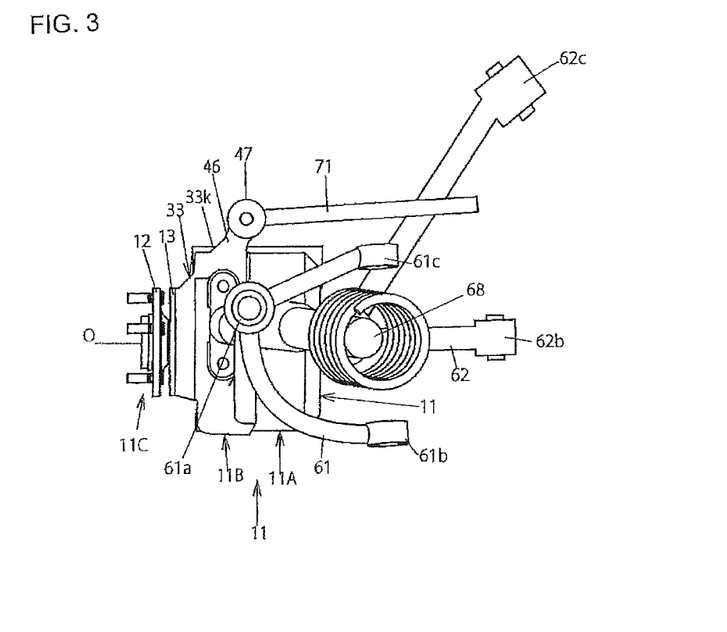
FIG. 3 is a plan view of the embodiment and a suspension device.
Figure 4:
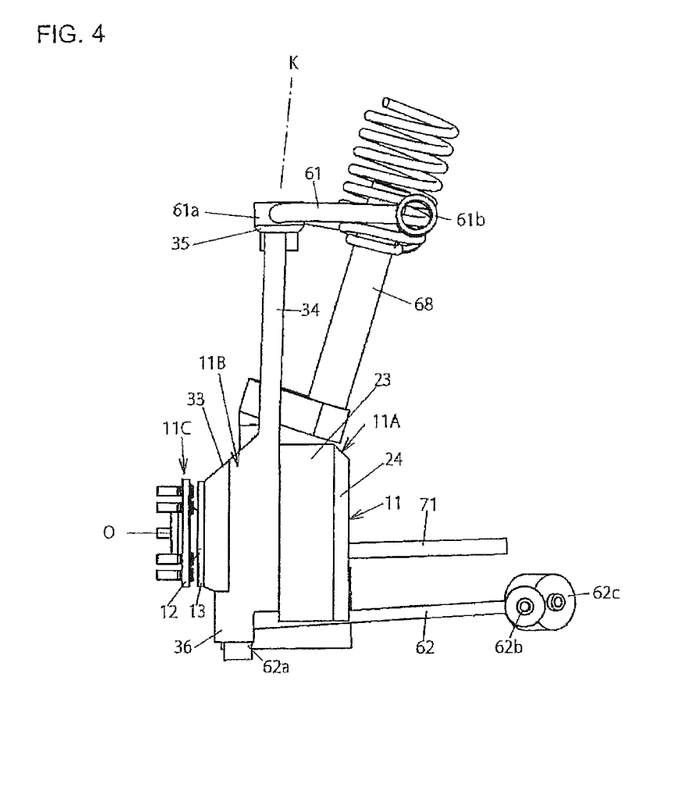
FIG. 4 is a front view of the embodiment and the suspension device as viewed from the front of a vehicle.
Figure 5:
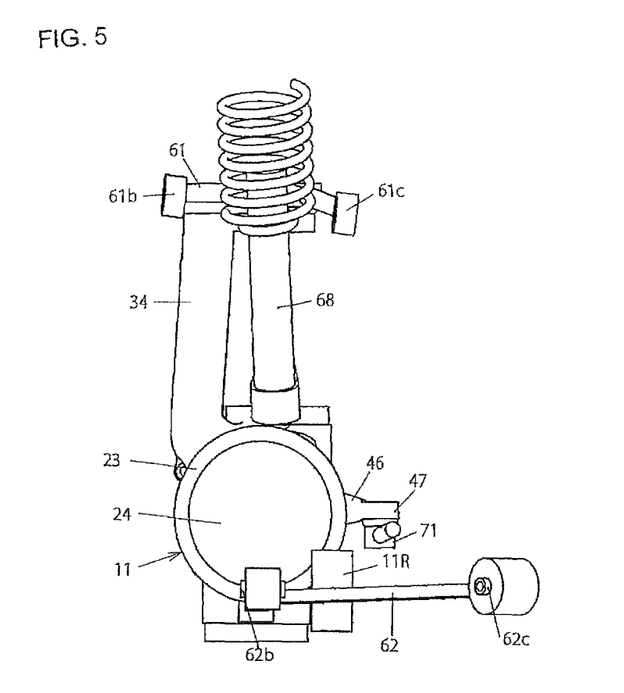
FIG. 5 is a side view of the embodiment and the suspension device as viewed from the inside in the lateral direction of the vehicle.
Figure 6:
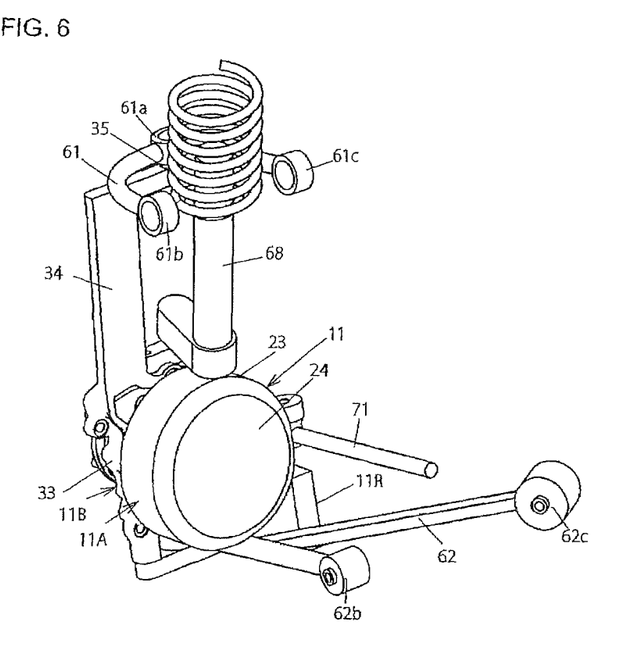
FIG. 6 is a perspective view of the embodiment and the suspension device as viewed from the inside in the lateral direction of the vehicle.

Embodiments of the present invention will be described in detail based on the accompanying drawings. The embodiments of the present invention are directed to an in-wheel motor drive unit for a steered front wheel of a vehicle. FIG. 1 is a perspective view of an in-wheel motor drive unit according to an embodiment of the present invention. FIG. 2 is a sectional view of a casing of the embodiment. FIGS. 3 to 6 show the embodiment attached to a suspension device. FIG. 3 is a plan view of the embodiment. In FIG. 3, the right side in the figure is the vehicle body side, and the lower side in the figure is the front side of the vehicle. FIG. 4 is a front view of the embodiment as viewed from the front of the vehicle. In FIG. 4, the right side in the figure is the vehicle body side, and the lower side in the figure is the lower side of the vehicle. FIG. 5 is a side view of the embodiment as viewed from the inside in the lateral direction of the vehicle. In FIG. 5, the left side in the figure is the front side of the vehicle, and the lower side in the figure is the lower side of the vehicle. FIG. 6 is a perspective view of the embodiment as viewed from the inside in the lateral direction of the vehicle.

First, an in-wheel motor drive unit 11 will be described. The in-wheel motor drive unit 11 includes a motor portion 11A, a speed reduction portion 11B, and a wheel hub portion 11C which are sequentially arranged in series in the direction of an axis O of the in-wheel motor drive unit 11. As shown in FIG. 4, the wheel hub portion 11C has a hub ring 12 as a rotary member, and an outer ring member 13 that rotatably supports the hub ring 12. The motor portion 11A, the speed reduction portion 11B, and the wheel hub portion 11C are sequentially and coaxially arranged in series in the direction of the axis O of the hub ring 12. A steered wheel, not shown, is attached and fixed to the hub ring 12 with bolts.

The in-wheel motor drive unit 11 is a unit that drives the steered wheel placed on the outer side in the lateral direction of the vehicle. The in-wheel motor drive unit 11 is placed in an inner space region of a road wheel of the steered wheel. When the steering angle of the steered wheel is 0°, the axis O of the in-wheel motor drive unit 11 extends parallel to the lateral direction of the vehicle as shown in FIGS. 3 to 6. The vehicle thus travels straight. The in-wheel motor drive unit 11 together with the steered wheel is steered about a steering axis, not shown, which extends in the vertical direction.

The motor portion 11A has a motor portion casing 23 located on the inner side in the lateral direction of the vehicle and having a relatively large outer diameter. The speed reduction portion 11B has a speed reduction portion casing 33 located on the outer side in the lateral direction of the vehicle and having a relatively small outer diameter. The motor portion casing 23, the speed reduction portion casing 33, and the outer ring member 13 are non-rotary members that form the outer shape of the in-wheel motor drive unit, whereas the hub ring 12 is a rotary member that extends through the outer ring member 13 and projects outward in the lateral direction of the vehicle.

The motor portion 11A contains a rotor and a stator of a rotating electrical machine in the motor portion casing 23. The motor portion 11A drives the hub ring 12 or regenerates electricity by using rotation of the hub ring 12. The speed reduction portion 11B contains a speed reduction mechanism such as, e.g., a cycloidal reduction gear in the speed reduction portion casing 33. The speed reduction portion 11B reduces the speed of rotation of the motor portion 11A to transmit the resultant rotation to the hub ring 12.

Figure 17:
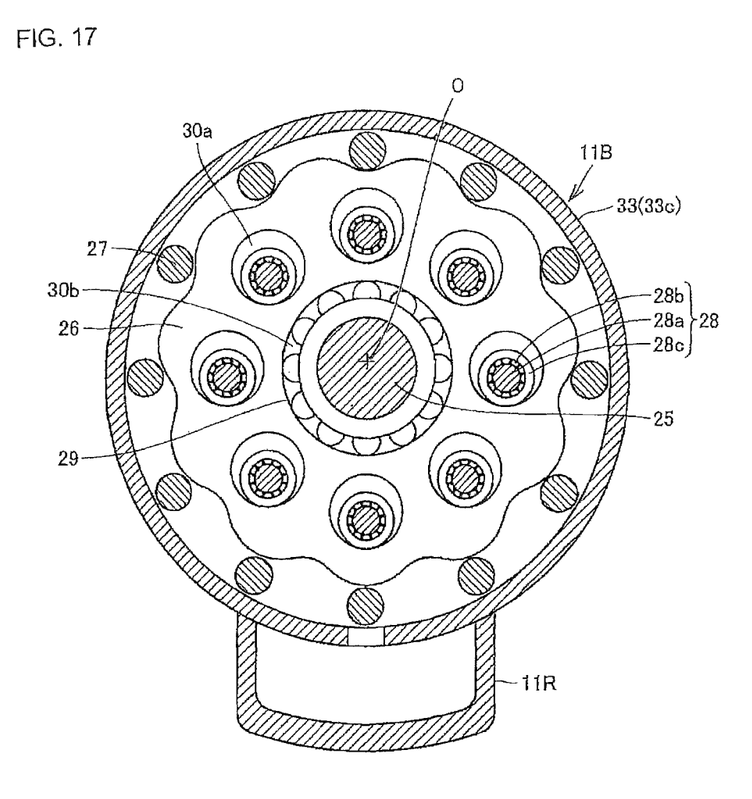
FIG. 17 is a schematic transverse section of a speed reduction portion of the in-wheel motor drive unit.

An example in which a cycloidal reduction gear is used in the speed reduction portion 11B will be briefly described. As shown in FIG. 17, the speed reduction portion 11B includes a disc-shaped eccentric member 25 eccentrically placed on an output shaft of the motor portion 11A, a curve board 26 concentrically attached to the eccentric member 25, a rolling bearing 29 placed between the outer periphery of the eccentric member 25 and the inner peripheral surface of a central hole 30b of the curve board 26, a plurality of outer pins 27 attached to the speed reduction portion casing 33, and a motion conversion mechanism that obtains rotation of the curve board 26 to output the rotation of the curve board 26 to the hub ring 12.

The curve board 26 described above has a wavy outer peripheral edge, and this outer peripheral edge of the curve board 26 engages with the plurality of outer pins 27 attached to the speed reduction portion casing 33. The outer pins 27 are arranged at regular intervals in the circumferential direction about the axis O, and the number of outer pins 27 is larger than the number of peaks in the wavy outer peripheral edge of the curve board 26 by one. The curve board 26 rotates slightly when the curve board 26 makes one revolution around the axis O.

The motion conversion mechanism is a mechanism that obtains rotation of the curve board 26 to output only the rotation of the curve board 26 to the hub ring 12. The motion conversion mechanism has a plurality of through holes 30a formed in the curve board 26 at intervals in the circumferential direction, inner pins 28 having an outer diameter smaller than the inner diameter of the through hole 30a and inserted through the through holes 30a, and a common flange portion (not shown) that supports one ends of the inner pins 28. The flange portion is coaxially attached and fixed to the hub ring 12 of the wheel hub portion 11C. The output shaft of the motor portion 11A and the hub ring 12 of the wheel hub portion 11C extend along the axis O, whereas the eccentric member 25 and the curve board 26 are placed eccentrically with respect to the axis O.

The inner pin 28 has an inner pin collar 28c, a shaft portion 28a inserted through the inner pin collar 28c, and a plurality of needles 28b arranged in annular clearance between the inner peripheral surface of the inner pin collar 28c and the outer peripheral surface of the shaft portion 28a. The inner pin 28 thus includes a rolling bearing and is in rolling contact with the inner wall surface of the through hole 30a.

As shown in FIG. 1, an oil tank 11R for storing oil that lubricates the motor portion 11A and the speed reduction portion 11B is placed at the lower part of the motor portion 11A and the speed reduction portion 11B so as to project radially outward from the motor portion casing 23 and the speed reduction portion casing 33.

Referring back to FIGS. 1 to 6, a first arm portion 34 extending upward in an arc form from the speed reduction portion casing 33 is formed so as to be integral with the upper part of the speed reduction portion 11B. Specifically, the first arm portion 34 is formed so that its base part is integral with the front upper part of the speed reduction casing 33 in the longitudinal direction of the vehicle and so that the first arm portion 34 extends inward in the lateral direction of the vehicle from the base part to a position above the motor portion 11A and outward in the lateral direction of the vehicle and upward in order to avoid interference with the steered wheel. Moreover, the first arm portion 34 extends toward the rear of the vehicle and upward, and a joint portion 35 of a ball joint is placed at the upper end of the first arm portion 34. The first arm portion 34 thus extends in the vertical direction from the inner space region of the road wheel so as to avoid the peripheral edge of the steered wheel. The upper end of the first arm portion 34 including the joint portion 35 is located above the steered wheel, in particular, above the axis O as shown in FIG. 2. The upper end of the first arm portion 34 is pivotally coupled to an upper arm 61 of a high-mount double wishbone suspension device via the ball joint.

A lower arm bracket 36 is provided in the lower part of the speed reduction portion 11B so as to be coupled to a lower arm 62 of the high-mount double wishbone suspension device. The lower arm bracket 36 is comprised of two projections (see FIG. 1) which are placed so as to be separated from each other in a direction perpendicular to the axis O and to project downward from the speed reduction portion casing 33. A ball joint is placed between the two projections of the lower arm bracket 36. The lower part of the speed reduction portion 11B is pivotally coupled to a free end of the lower arm 62 via the ball joint. An imaginary straight line connecting the ball joint in the lower arm bracket 36 and the ball joint at the upper end of the first arm portion 34 forms the steering axis (kingpin) of the in-wheel motor drive unit 11 and the steered wheel. The in-wheel motor drive unit 11 together with the steered wheel can be steered about the steering axis.

As shown in FIGS. 3 to 6, the suspension device includes the upper arm 61 coupled to the upper part of the in-wheel motor drive unit 11, the lower arm 62 coupled to the lower part of the in-wheel motor drive unit 11, and a damper 68 that attenuates bounding and rebounding of the in-wheel motor drive unit 11.

The upper arm 61 can swing in the vertical direction with the lateral inner ends 61b, 61c, or inner ends in the lateral direction of the vehicle, as base ends and a lateral outer end 61a, or an outer end in the lateral direction of the vehicle, as a free end. A ball portion of the ball joint is placed at the lateral outer end 61a of the upper arm 61. The outer spherical surface of the ball portion is surrounded by the inner spherical surface of the joint portion 35. The lateral outer end 61a of the upper arm 61 is thus pivotally coupled to the upper end of the first arm portion 34 via the ball joint. The lateral inner ends 61b, 61c of the upper arm 61 have a swing axis extending in the longitudinal direction of the vehicle and are coupled to a vehicle body-side member, not shown, i.e., a vehicle body. Accordingly, the upper arm 61 can swing about the swing axis of the lateral inner ends 61b, 61c. Since the ball joint including the joint portion 35 can pivot in a universal direction, this ball joint can not only change the angle between the upper arm 61 and the first arm portion 34 but also serve as the steering axis K extending substantially in the vertical direction.

The lower arm 62 can swing in the vertical direction with lateral inner ends 62b, 62c, or inner ends in the lateral direction of the vehicle, as base ends and a lateral outer end 62a, or an outer end in the lateral direction of the vehicle, as a free end. A ball portion of a ball joint is placed at the lateral outer end 62a of the lower arm 62. The outer spherical surface of the ball portion is surrounded by the inner spherical surface of the ball joint, not shown, fixed to the lower arm bracket 36. The lateral outer end 62a of the lower arm 62 is thus pivotally coupled to the lower part of the speed reduction portion casing 33 via the ball joint. The lateral inner ends 62b, 62c of the lower arm 62 have a swing axis extending in the longitudinal direction of the vehicle and are coupled to the vehicle body-side member, not shown. Accordingly, the lower arm 62 can swing about the swing axis of the lateral inner ends 62b, 62c. Since the ball joint connecting the lower arm 62 and the speed reduction portion casing 33 can pivot in a universal direction, this ball joint can not only change the angle between the lower arm 62 and the speed reduction portion casing 33 but also serve as the steering axis K extending substantially in the vertical direction.

The casing of the in-wheel motor drive unit 11 will be described in detail with reference to FIG. 2. The casing that forms the outer shape of the in-wheel motor drive unit 11 is assembled by putting together three members, namely the speed reduction portion casing 33 that forms the outer shape of the speed reduction portion 11B, and the motor portion casing 23 and a motor cover 24 which form the outer shape of the motor portion 11A.

Of these three members, the motor portion casing 23 is a single-piece member including a cylindrical portion 23c having a tubular shape and an inward flange portion 23t that is continuous with the end on the speed reduction portion side of the cylindrical portion. The motor cover 24 is a disc-shaped single-piece member that closes the opposite end of the motor portion casing 23 from the speed reduction portion. The speed reduction portion casing 33 includes a cylindrical portion 33c having a tubular shape, an annular speed reduction portion casing end face portion 33t that is continuous with an end of the cylindrical portion 33c, and the lower arm bracket 36 formed integrally with the cylindrical portion 33c. The cylindrical portion 33c and the speed reduction portion casing end face portion 33t are formed integrally with the first arm portion 34. A connection portion 33j between the speed reduction portion casing 33 and the first arm portion 34 is located on the outer peripheral surface of the speed reduction portion casing 33. The first arm portion 34 projects outward from the connection portion 33j in a direction perpendicular to the axis O. That is, the speed reduction portion casing 33, the first arm portion 34, and the lower arm bracket 36 are together formed as a single-piece member.

The connection portion 33j extends on both the outer peripheral surface of the cylindrical portion 33c and the speed reduction portion casing end face portion 33t. Alternatively, in a modification, not shown, the connection portion 33j may be formed only on the outer peripheral surface of the cylindrical portion 33c or may be formed only on the speed reduction portion casing end face portion 33t.

The first arm portion 34 is separated from the inward flange portion 23t of the motor portion casing 23. The inner periphery of the inward flange portion 23t is coupled and fixed to an end of the cylindrical portion 33c. The inner periphery of the speed reduction portion casing end face portion 33t is coupled and fixed to an end of the outer ring member 13.

According to the present embodiment, the first arm portion 34 is continuous with the speed reduction portion casing 33 via the connection portion 33j. This eliminates the need to couple and fix an arm member to the casing of the in-wheel motor drive unit with a bolt, a nut, etc. as in the conventional examples. The connection portion between the first arm portion 34 and the in-wheel motor drive unit 11 can therefore be made thinner than in the conventional examples, and also no coupling parts such as a bolt and a nut are required, whereby reduction in unsprung weight of the suspension device can be achieved. Moreover, since the first arm portion 34 is formed integrally with the speed reduction portion casing 33, the number of parts can be reduced. Since the first arm portion 34 is not coupled to the motor portion casing 23, neither a vehicle body load nor a lateral load is applied to the motor portion casing 23, and there is no risk of deformation of the motor portion casing 23 due to an excessive load.

According to the present embodiment, the radius dimension of the outer ring member 13 is smaller than that of the speed reduction portion casing 33, and the speed reduction portion casing 33 includes the speed reduction portion casing end face portion 33t that covers the opposite end of the speed reduction portion from the motor portion casing 23 in the direction of the axis O. The inner periphery of the speed reduction portion casing end face portion 33t is connected to the outer ring member 13, and the outer periphery of the speed reduction portion casing end face portion 33t is integral with the first arm portion 34. This allows the first arm portion 34 to be extended to a position outside the road wheel through an annular space between the outer peripheral surface of the speed reduction portion 11B and the inner peripheral surface (not shown) of the road wheel of the wheel. The first arm portion 34 can thus be arranged in a manner that is preferable for a suspension member for a steered wheel as shown in FIGS. 3 to 6. Since the speed reduction portion casing end face portion 33t is located closest to the wheel among the members of the speed reduction portion 11B, the vehicle body load supported by the first arm portion 34 can be transmitted to the wheel over a short distance in the direction of the axis O.

According to the present embodiment, the first arm portion 34 supports the vehicle body load to serve as a suspension member of the suspension device. That is, the tip end of the first arm portion 34 is pivotally coupled to the lateral outer end 61a as the free end of the upper arm 61 of the suspension device via the ball joint (the joint portion 35). Accordingly, reduction in unsprung weight, an increase in strength of unsprung parts, and reduction in the number of unsprung parts can be achieved in the case where the vehicle uses a double wishbone suspension device.

The in-wheel motor drive unit 11 of the present embodiment further includes a second arm portion 46 in addition to the first arm portion 34, as shown in FIG. 3. The second arm portion 46 is formed integrally with the cylindrical portion 33c of the speed reduction portion casing 33 and projects radially outward of the cylindrical portion 33c (toward the rear of the vehicle) from a connection portion 33k between the second arm portion 46 and the cylindrical portion 33c. A tip end 47 of the second arm portion 46 is coupled to a power source for a steering device, not shown, for example, a steering gear box, via a tie rod 71. That is, the speed reduction portion casing 33 is formed integrally with the second arm portion 46. The connection portion 33k is formed only on the outer peripheral surface of the cylindrical portion 33c and is not formed on the speed reduction portion casing end face portion 33t. Alternatively, in a modification, not shown, the connection portion 33k may be formed only on the speed reduction portion casing end face portion 33t. In the present embodiment, the connection portion 33k is located on the rear side of the speed reduction portion casing 33. However, the connection portion 33k may be located on the front side of the speed reduction portion casing 33.

As described above, according to the present embodiment, reduction in unsprung weight, an increase in strength, and reduction in the number of parts can be achieved in the suspension device for attaching a front wheel etc. to the vehicle body.

Figure 7:
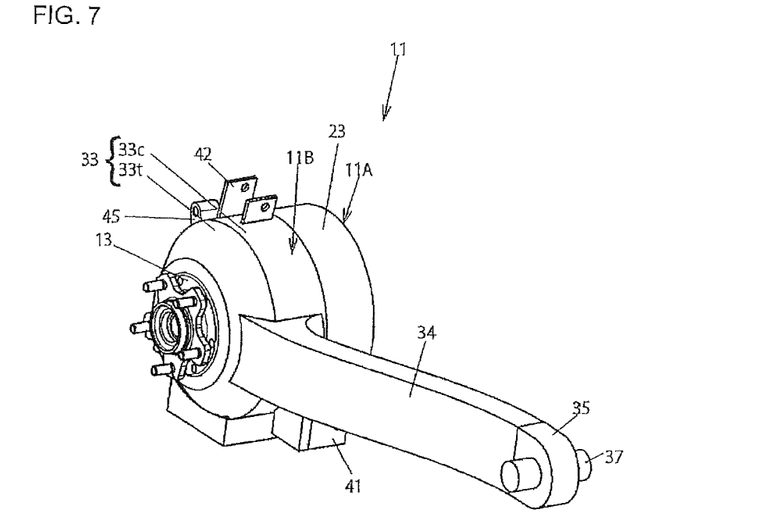
FIG. 7 is a perspective view of an in-wheel motor drive unit according to another embodiment of the present invention as viewed from the outside in the lateral direction of a vehicle.
Figure 8:
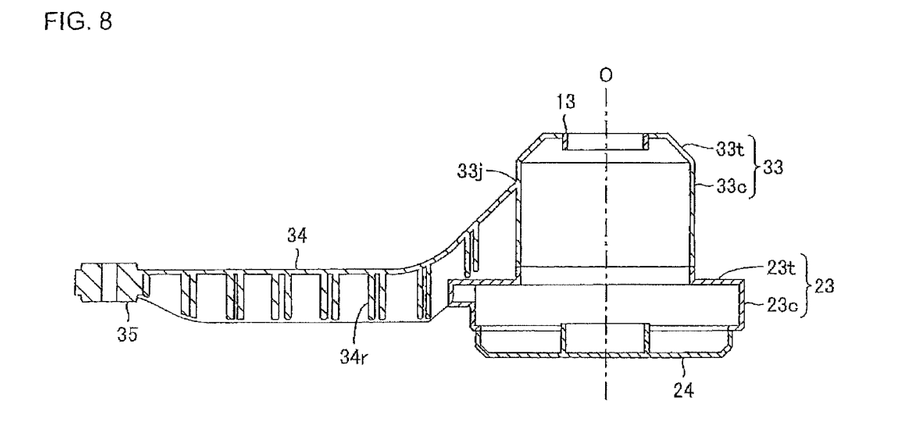
FIG. 8 is a schematic sectional view of a casing of the another embodiment.
Figure 9:
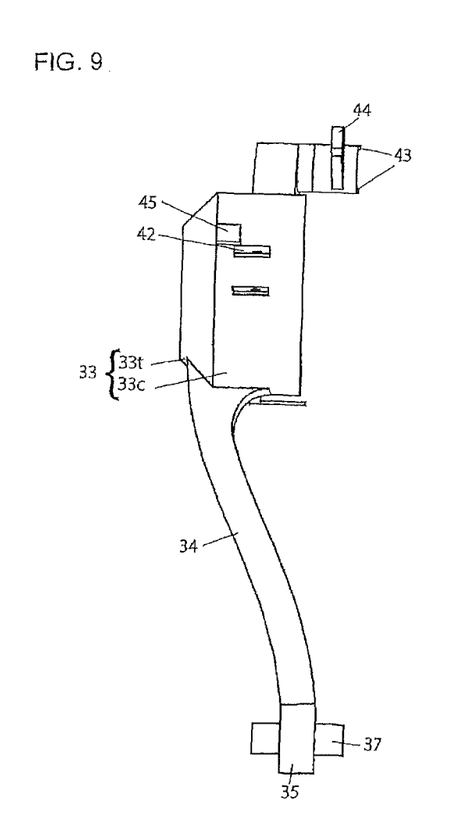
FIG. 9 is a plan view of a speed reduction portion casing of the another embodiment.
Figure 10:
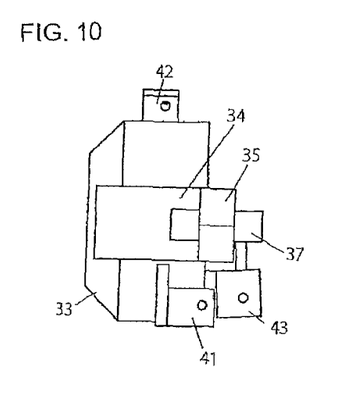
FIG. 10 is a front view of the speed reduction portion casing of the another embodiment as viewed from the front of the vehicle.
Figure 13:
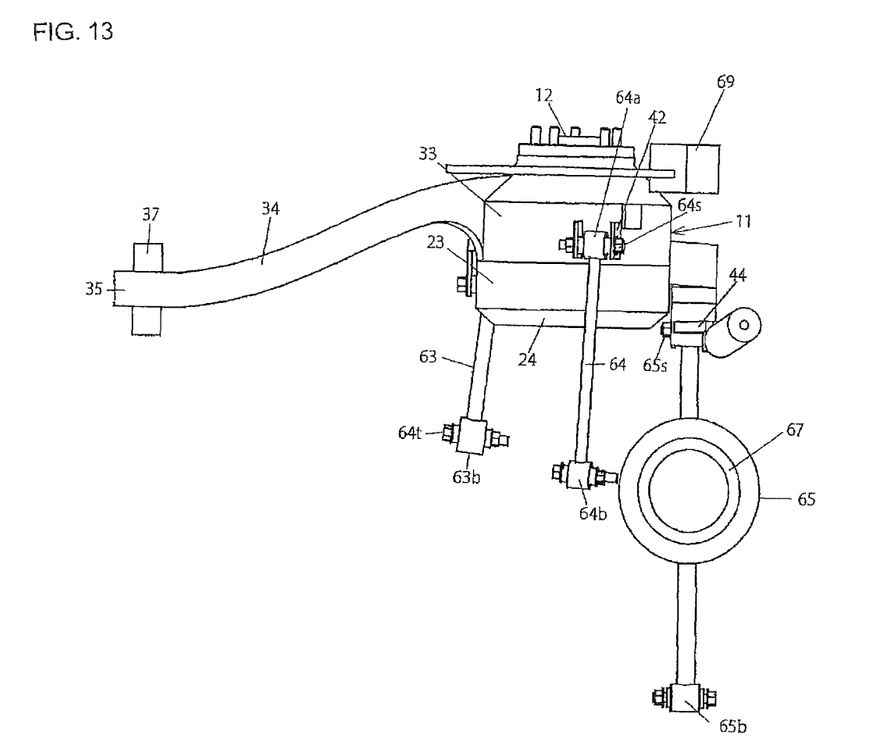
FIG. 13 is a plan view of the in-wheel motor drive unit of the another embodiment and a suspension device.
Figure 14:
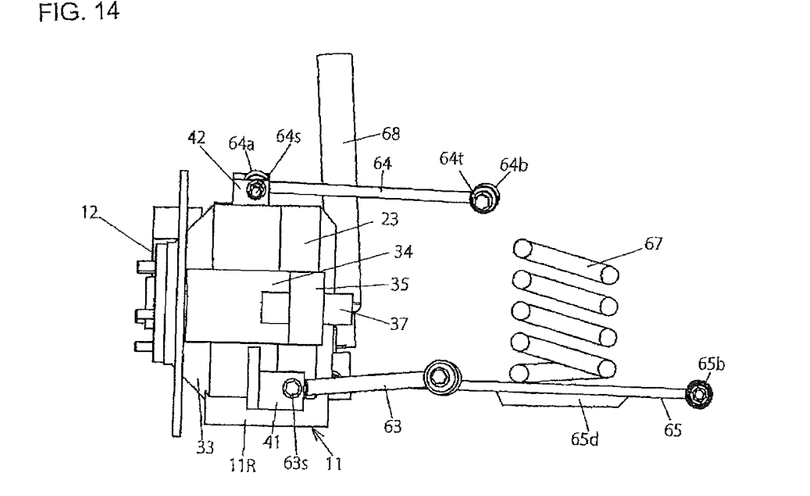
FIG. 14 is a front view of the in-wheel motor drive unit of the another embodiment and the suspension device as viewed from the front of the vehicle.
Figure 15:
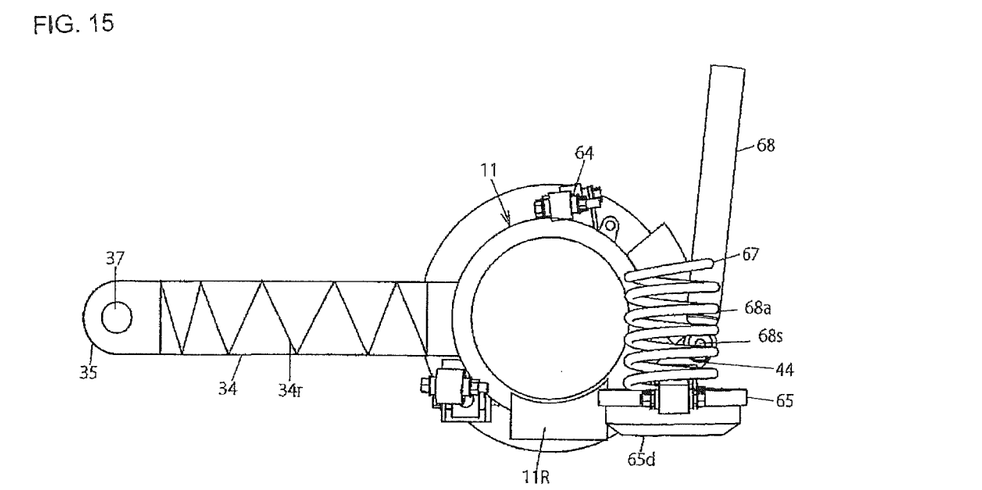
FIG. 15 is a side view of the in-wheel motor drive unit of the another embodiment and the suspension device as viewed from the inside in the lateral direction of the vehicle.
Figure 16:
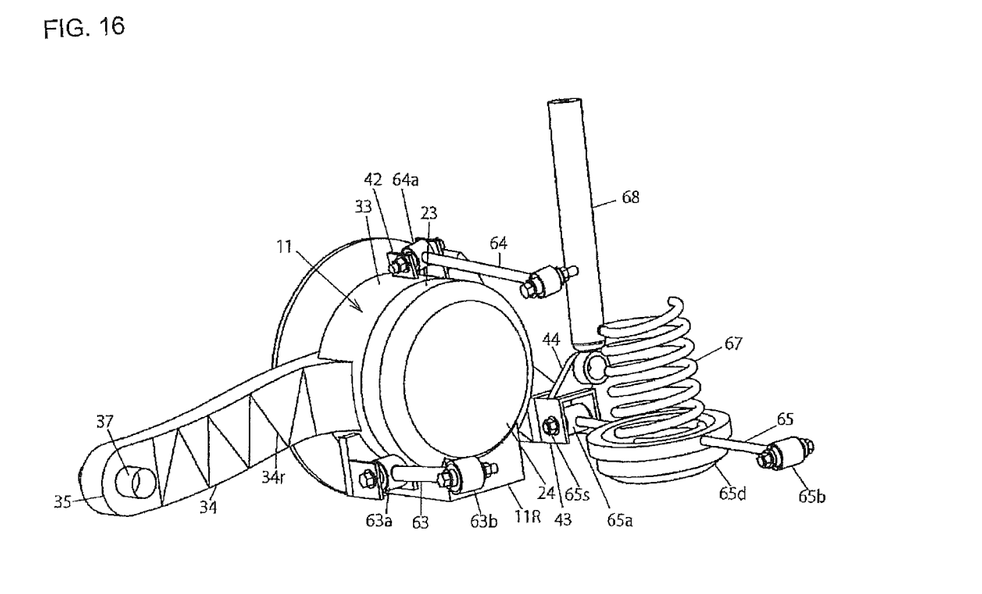
FIG. 16 is a perspective view of the in-wheel motor drive unit of the another embodiment and the suspension device as viewed from the inside in the lateral direction of the vehicle.

Another embodiment of the present invention will be described below. Another embodiment is directed to an in-wheel motor drive unit for a non-steered rear wheel. FIG. 7 is a perspective view of the in-wheel motor drive unit of this embodiment of the present invention as viewed from the outside in the lateral direction of a vehicle. FIG. 8 is a schematic sectional view of a casing of this embodiment. FIGS. 9 to 12 are illustrations of a speed reduction portion casing of this embodiment. FIGS. 13 to 16 are illustrations showing the in-wheel motor drive unit of this embodiment together with a suspension device. In FIG. 13, the right side in the figure is the rear side of the vehicle, and the lower side in the figure is the vehicle body side. In FIG. 14, the right side in the figure is the vehicle body side, and the lower side in the figure is the lower side of the vehicle. In FIG. 15, the right side in the figure is the rear side of the vehicle, and the lower side in the figure is the lower side of the vehicle.

In this embodiment, the same configurations as those of the above embodiment are denoted with the same reference characters, and description thereof will be omitted. The configurations different from those of the above embodiment will be described below. In this embodiment, as shown in FIG. 7, the first arm portion 34 extends from the speed reduction portion 11B toward the front of the vehicle and functions as a suspension arm. That is, the first arm portion 34 is a suspension arm of a trailing arm suspension device. The first arm portion 34 extends in the longitudinal direction of the vehicle such that the tip end of the first arm portion 34 which has the joint portion 35 is a base end and the speed reduction casing 33 at the base part of the first arm portion 34 is a free end. The free end side of the first arm portion 34 swings in the vertical direction. The joint portion 35 is pivotally coupled to the vehicle body via a shaft 37. The shaft 37 extends along an imaginary axis extending straight in the lateral direction of the vehicle and extends through a central hole of the joint portion 35. A plurality of ribs 34r extending vertically in a zigzag manner are formed on the inner side surface of the first arm portion 34 in the lateral direction of the vehicle (see FIGS. 8, 11, 12, 15, and 16). The height of the rib 34r projecting inward in the lateral direction of the vehicle is large in its lower part and is small in its upper part, and the rib 34r has a boundary stepped portion 34h at the connection portion between the upper and lower parts. The boundary stepped portion 34h extends substantially horizontally. As an example, the boundary stepped portion 34h may support a power cable, not shown, that extends from the in-wheel motor drive unit 11 to the vehicle body.

Figure 11:
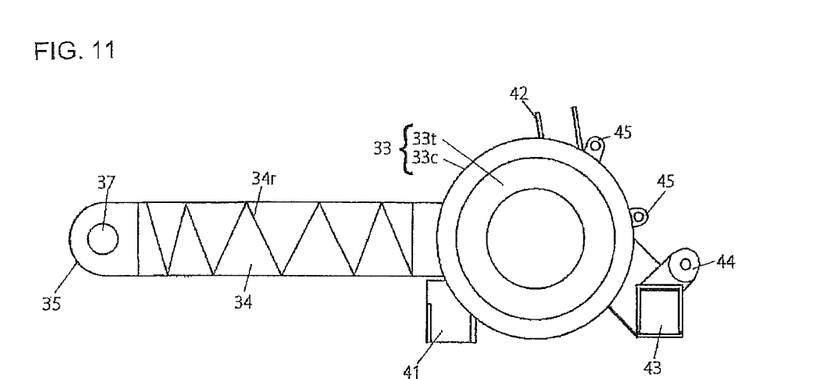
FIG. 11 is a side view of the speed reduction portion casing of the another embodiment as viewed from the inside in the lateral direction of the vehicle.
Figure 12:
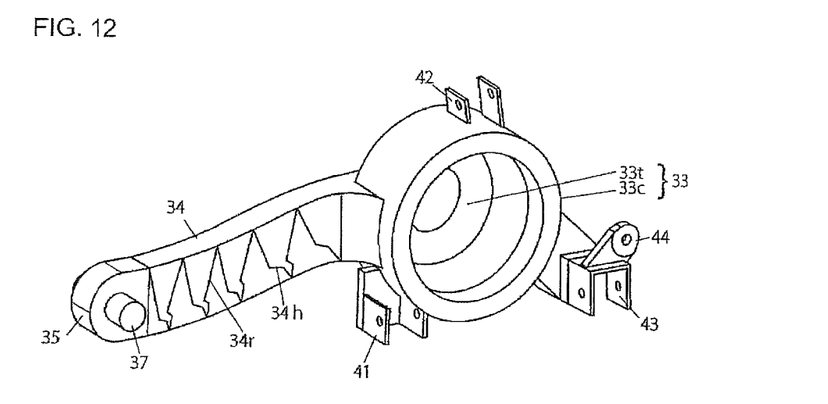
FIG. 12 is a perspective view of the speed reduction portion casing of the another embodiment as viewed from the inside in the lateral direction of the vehicle.

In this embodiment, the speed reduction portion casing 33 further has first to fourth brackets 41 to 45 (see FIG. 11). The first bracket 41 is formed integrally with the base part of the first arm portion 34 and the cylindrical part 33c of the speed reduction portion casing 33. The first bracket 41 is located on the outer peripheral surface of the front lower part (on the front side of the vehicle) of the speed reduction portion casing 33. The first bracket 41 is pivotally coupled to a lateral outer end 63a, or an outer end in the lateral direction of the vehicle, of a first link 63 via a shaft 63s extending in the longitudinal direction of the vehicle.

The second bracket 42 is formed integrally with the cylindrical portion 33c of the speed reduction portion casing 33. The second bracket 42 is located on the outer peripheral surface of the rear upper part (on the rear side of the vehicle) of the speed reduction portion casing 33. The second bracket 42 is pivotally coupled to a lateral outer end 64a, or an outer end in the lateral direction of the vehicle, of a second link 64 via a shaft 64s extending in the longitudinal direction of the vehicle (see FIGS. 14 and 16).

The third bracket 43 is formed integrally with the cylindrical portion 33c of the speed reduction portion casing 33. The third bracket 43 is located on the outer peripheral surface of the rear lower part (on the rear side of the vehicle) of the speed reduction portion casing 33. The third bracket 43 is pivotally coupled to a lateral outer end 65a, or an outer end in the lateral direction of the vehicle, of a third link 65 via a shaft 65s extending in the longitudinal direction of the vehicle (see FIG. 16).

The fourth bracket 44 is formed integrally with the cylindrical portion 33c of the speed reduction portion casing 33 at a position rearward of the third bracket 43. The fourth bracket 44 is located on the outer peripheral surface of the rear lower part of the speed reduction portion casing 33. The fourth bracket 44 is pivotally coupled to a lower end 68a of the damper 68 via a shaft 68s extending in the lateral direction of the vehicle (see FIG. 15).

The fifth bracket 45 is comprised of two projecting pieces, and each projecting piece has a through hole. One of the projecting pieces of the fifth bracket 45 is located rearward of (closer to the rear of the vehicle than) the second bracket 45 and is formed integrally with the cylindrical portion 33c of the speed reduction portion casing 33. The other projecting piece of the fifth bracket 45 is located on the rear part (on the rear side of the vehicle) of the speed reduction portion casing 33 and is formed integrally with the cylindrical portion 33c. The fifth bracket 45 is located on the outer peripheral surface of the rear part (on the rear side of the vehicle) of the speed reduction casing 33. A brake caliper 69 is coupled and fixed to the fifth bracket 45 (see FIG. 13).

The suspension device of this embodiment will be described. Each of the first to third links 63 to 65 extends in the lateral direction of the vehicle and can swing in the vertical direction with its lateral outer end, or its outer end in the lateral direction of the vehicle, as a free end and its lateral inner end, or its inner end in the lateral direction of the vehicle, as a base end. The lateral inner ends of the first to fifth links 63 to 65 are pivotally coupled to the vehicle body, not shown, via shafts. The lateral outer ends of the first to fifth links 63 to 65 are pivotally coupled to the first to third brackets 41 to 43 via shafts, respectively. The first to third links 63 to 65 thus regulate the lateral position, or the position in the lateral direction of the vehicle, of the first arm portion 23 serving as a trailing arm, and allows the first arm portion 23 to swing in the vertical direction. The second link 64 will be described as a representative example, and description of the first link 63 and the third link 65 will be omitted. The second link 64 can swing in the vertical direction with its lateral inner end 64b as a base end and its lateral outer end 64a as a free end. The lateral inner end 64b is pivotally coupled to a vehicle body frame (vehicle body-side member), not shown, via a shaft 64t extending in the longitudinal direction of the vehicle. The middle part of the third link 65 is wider than both ends thereof and is provided with a circular seat 65d. The seat 65d supports the lower end of a coil spring 67 (see FIGS. 15 and 16). The coil spring 67 extends helically in the vertical direction, and the upper end of the coil spring 67 is attached to the vehicle body. The coil spring 67 absorbs the vertical swinging motion of the in-wheel motor drive unit 11.

The damper 68 extends in the vertical direction. The upper end of the damper 68 is attached to the vehicle body, and the lower end thereof is pivotally coupled to the fourth bracket 44 via a shaft. The damper 68 dampens the vertical swinging motion of the in-wheel motor drive unit 11 (see FIG. 15).

According to this embodiment, in the case where the in-wheel motor drive unit 11 is attached to the vehicle body by using a trailing arm suspension device, the first arm portion 34 is used as a trailing arm. Accordingly, reduction in unsprung weight, an increase in strength, and reduction in the number of parts can be achieved in the suspension device that attaches a rear wheel, a non-steered wheel, etc. to the vehicle body.

Referring to FIG. 2 or 8, the outer ring member 13 and the speed reduction portion casing 33 are separate members, and the outer ring member 13 and the speed reduction portion casing 33 are coupled and fixed together by press fitting, bolting, etc. The outer ring member 13 is made of steel that is resistant to wear. The speed reduction portion casing 33 is made of aluminum or an aluminum alloy that is lightweight and has high flexural strength. The first arm portion 34 and the speed reduction portion casing 33 can thus be made lighter than conventional steel knuckles, and further reduction in weight of the in-wheel motor drive unit 11 can be achieved.

Although the embodiments of the present invention are described above with reference to the drawings, the present invention is not limited to the illustrated embodiments. Various modifications and variations can be made to the illustrated embodiments within a scope that is the same as, or equivalent to, that of the invention.

INDUSTRIAL APPLICABILITY

The in-wheel motor drive unit of the present invention is advantageously used in electric vehicles and hybrid vehicles using both a motor and an internal combustion engine as driving sources for wheels.

REFERENCE SIGNS LIST

11 In-Wheel Motor Drive Unit
11A Motor Portion
11B Speed Reduction Portion
11C Wheel Hub Portion
12 Hub Ring
13 Outer Ring Member
23 Motor Portion Casing
23c Cylindrical Portion
23t Inward Flange Portion
24 Motor Cover
33 Speed Reduction Portion Casing
33c Cylindrical Portion
33t Speed Reduction Portion Casing End Face Portion
33j, 33k Connection Portion
34 First Arm Portion
34r Rib
35 Joint Portion
36 Lower Arm Bracket
37 Shaft
41 First Bracket
42 Second Bracket
43 Third Bracket
44 Fourth Bracket 45 Fifth Bracket
46 Second Arm Portion
61 Upper Arm
62 Lower Arm
63 First Link
64 Second Link
65 Third Link
65d Seat
67 Coil Spring
68 Damper
69 Brake Caliper
71 Tie Rod
K Steering Axis
O Axis

The invention claimed is:

1. An in-wheel motor drive unit, comprising:
a motor portion that is placed on one side in a direction of an axis of said in-wheel motor drive unit;
a wheel hub portion that is placed on the other side in said direction of said axis of said in-wheel motor drive unit;
a speed reduction portion that is placed between said motor portion and said wheel hub portion and that reduces a speed of output rotation of said motor portion to transmit the resultant output rotation to said wheel hub portion; and
a first arm portion that is formed integrally with the speed reduction portion casing forming an outer shape of said speed reduction portion, wherein
said first arm portion projects in a upward direction perpendicular to said axis from said speed reduction portion casing so that said first arm portion is extended to a position outside a road wheel being coupled to said wheel hub portion, and that has an upper end thereof pivotally coupled to a vehicle body-side member, wherein
said first arm portion extends in an arc from an inner space region of said road wheel so as to avoid a peripheral edge of said road wheel.

2. The in-wheel motor drive unit according to claim 1, wherein
said wheel hub portion has a hub ring that is coupled to a wheel and an outer ring member that rotatably supports said hub ring, and said outer ring member has a smaller radius dimension than that of said speed reduction portion casing,
said speed reduction portion casing includes a tubular portion that surrounds an outer periphery of said speed reduction portion, and a speed reduction portion casing end face portion that covers an end of said speed reduction portion which is located on the other side in said direction of said axis, and
an inner periphery of said speed reduction portion casing end face portion is coupled to said outer ring member, and an outer periphery of said speed reduction portion casing end face portion is integral with said first arm portion.

3. The in-wheel motor drive unit according to claim 1, wherein
said speed reduction portion casing includes a tubular portion that surrounds an outer periphery of said speed reduction portion, and a speed reduction portion casing end face portion that covers an end of said speed reduction portion which is located on the other side in said direction of said axis, and
an outer peripheral surface of said tubular portion is integral with said first arm portion.

4. The in-wheel motor drive unit according to claim 1, wherein
said upper end of said first arm portion is pivotally coupled to a free end of an upper arm of a double wishbone suspension device.

5. The in-wheel motor drive unit according to claim 4, further comprising:
a joint portion that is formed integrally with said speed reduction portion casing and that is coupled to a free end of a lower arm of said double wishbone suspension device.

6. The in-wheel motor drive unit according to claim 4, further comprising:
a second arm portion that is formed integrally with said speed reduction portion casing and that projects in said direction perpendicular to said axis from said speed reduction portion casing, wherein
a tip end of said second arm portion is coupled to a power source for a steering device.

7. The in-wheel motor drive unit according to claim 1, wherein
said first arm portion and said speed reduction portion casing are made of aluminum or an aluminum alloy.

* * * * *